United States Patent
Draaisma (10) Patent No.: US 7,385,731 B2
(45) Date of Patent: Jun. 10, 2008

(54) METHOD AND SYSTEM FOR PROCESSING A MULTI-COLOUR IMAGE

(75) Inventor: Henricus Johannes George Draaisma, Venlo (NL)

(73) Assignee: Océ Technologies B.V., Venlo (NL)

( * ) Notice: Subject to any disclaimer, the term of this patent is extended or adjusted under 35 U.S.C. 154(b) by 959 days.

(21) Appl. No.: 10/454,695

(22) Filed: Jun. 5, 2003

(65) Prior Publication Data

US 2003/0227638 A1     Dec. 11, 2003

(30) Foreign Application Priority Data

Jun. 5, 2002     (EP)     .................................. 02077308

(51) Int. Cl.
  *H04N 1/405*     (2006.01)
  *G06K 9/00*     (2006.01)

(52) U.S. Cl. .................. 358/3.3; 358/1.9; 358/2.1; 358/3.01; 358/3.13; 358/3.14; 358/3.23; 358/3.26; 358/512; 358/518; 358/519; 358/535; 382/162; 382/164; 382/167; 382/172; 382/169

(58) Field of Classification Search ................. 358/1.9, 358/3.26, 3.3, 535, 534, 3.13, 3.14, 3.19, 358/2.1, 3.01, 521, 518, 512, 519, 3.23; 347/131, 347/115; 382/162, 169, 172, 164, 167
See application file for complete search history.

(56) References Cited

U.S. PATENT DOCUMENTS

| | | | |
|---|---|---|---|
| 5,023,708 A * | 6/1991 | Maruyama et al. ......... 358/540 |
| 5,032,853 A * | 7/1991 | van Stiphout et al. ...... 347/116 |
| 5,404,156 A | 4/1995 | Yamada et al. |
| 5,708,514 A * | 1/1998 | Higuchi et al. ............ 358/3.03 |
| 5,751,920 A * | 5/1998 | Dalton ........................ 358/1.9 |
| 6,166,828 A * | 12/2000 | Yamada et al. .............. 358/1.8 |
| 6,172,767 B1 * | 1/2001 | Takemoto .................... 358/1.9 |
| 6,352,806 B1 | 3/2002 | Dalal |
| 6,862,111 B2 * | 3/2005 | Lin et al. ..................... 358/1.9 |

FOREIGN PATENT DOCUMENTS

| | | |
|---|---|---|
| EP | 0 370 271 A2 | 5/1990 |
| EP | 0 373 704 A1 | 6/1990 |
| EP | 0 373 704 B1 | 6/1990 |
| EP | 0 637 886 A2 | 2/1995 |
| JP | 2-213871 A | 8/1990 |
| WO | WO 90/10991 A1 | 9/1990 |
| WO | WO 93/22871 A1 | 11/1993 |

* cited by examiner

*Primary Examiner*—King Y. Poon
*Assistant Examiner*—S. Kau
(74) *Attorney, Agent, or Firm*—Birch, Stewart, Kolasch & Birch, LLP (57) ABSTRACT

A method and system are provided for processing digital multi-colour images for the reproduction thereof on a colour printing and/or copying system. Particularly, the printing and/or copying system is capable of complementary forming registered composite multi-colour images of coloured marking particles. This means that the separation images of coloured marking particles are formed contiguous to each other rather than in a superimposed relationship. The digital multi-colour images are processed such that during reproduction thereof any adverse effects on image quality caused by register errors in a predetermined direction are eliminated or at least limited. To accomplish this, a particular halftoning technique is used wherein with gradually increasing input density value of the image pixels, a linear growth pattern is generated in the predetermined direction by alternately adding image dots to both sides.

16 Claims, 3 Drawing Sheets

FIG.1

| 67 | 219 | 171 | 255 |
|---|---|---|---|
| 51 | 211 | 163 | 247 |
| 35 | 203 | 167 | 239 |
| 11 | 195 | 91 | 231 |
| 3 | 159 | 83 | 223 |
| 7 | 151 | 75 | 227 |
| 15 | 127 | 59 | 235 |
| 31 | 119 | 43 | 243 |
| 47 | 123 | 27 | 251 |
| 63 | 131 | 19 | 187 |
| 111 | 147 | 23 | 179 |
| 103 | 155 | 39 | 143 |
| 95 | 191 | 55 | 135 |
| 99 | 199 | 71 | 139 |
| 107 | 207 | 79 | 175 |
| 115 | 215 | 87 | 183 |

FIG.2a

| | | | |
|---|---|---|---|
| K | | | |
| K | | | |
| K | | | |
| K | | | |
| K | | | |
| K | | | |
| K | K | | |
| K | K | | |
| K | K | | |
| K | K | | |
| | K | | |
| | K | | |
| | K | | |
| | | | |
| | | | |
| | | | |

FIG.2b

| | | | |
|---|---|---|---|
| M | | | |
| M | | | |
| M | | | |
| M | | | |
| M | M | | |
| M | M | | |
| M | M | | |
| M | M | | |
| M | M | | |
| M | M | | |
| M | M | | |
| | M | | |
| | M | | |
| | M | | |
| | M | | |
| | M | | |

FIG.2c

| | | | |
|---|---|---|---|
| M | | | |
| K | | | |
| K | | | |
| K | | | |
| K | M | | |
| K | M | | |
| K | K | | |
| K | K | | |
| K | K | | |
| K | K | | |
| M | K | | |
| | K | | |
| | K | | |
| | M | | |
| | M | | |

FIG.2d

| | | | |
|---|---|---|---|
| K | | | |
| K | | | |
| K | | | |
| K | | | |
| K | M | | |
| K | K | | |
| K | K | | |
| K | K | | |
| M | K | | |
| M | K | | |
| | K | | |
| | K | | |
| | M | | |
| | M | | |
| | M | | |

FIG.2e

| 251 | 235 | 227 | 111 |
|---|---|---|---|
| 243 | 219 | 123 | 15 |
| 211 | 135 | 11 | 99 |
| 75 | 7 | 87 | 171 |
| 3 | 63 | 163 | 179 |
| 51 | 155 | 187 | 115 |
| 147 | 195 | 127 | 31 |
| 203 | 139 | 27 | 103 |
| 79 | 23 | 91 | 183 |
| 19 | 67 | 191 | 175 |
| 55 | 199 | 167 | 119 |
| 207 | 159 | 131 | 47 |
| 151 | 143 | 43 | 107 |
| 83 | 39 | 95 | 215 |
| 35 | 71 | 223 | 247 |
| 59 | 231 | 239 | 255 |

FIG.3a

| | | | |
|---|---|---|---|
| | | | |
| | | | Y |
| | | Y | |
| | Y | | |
| Y | | | |
| | | | |
| | | | Y |
| | | Y | |
| | Y | | |
| Y | | | |
| | | | |
| | | | |
| | | | |
| | Y | | |
| Y | | | |
| | | | |

FIG.3b

| M | | | |
|---|---|---|---|
| K | | | Y |
| K | | Y | |
| K | Y | | |
| K | | | M |
| K | | | M |
| K | | K | |
| K | | K | Y |
| K | | K | |
| K | Y | K | |
| M | | K | |
| | | K | |
| | | K | |
| | Y | M | |
| Y | | M | |
| | | | |

FIG.3c

METHOD AND SYSTEM FOR PROCESSING A MULTI-COLOUR IMAGE

The present application claims the priority benefit of European Patent Application No. 02077308.1, filed on Jun. 5, 2002, the entire contents of which are herein fully incorporated by reference.

FIELD OF THE INVENTION

The present invention is related to the processing of multi-colour images for reproduction on a printing or copying system. Particularly of interest are systems for forming images composed of a plurality of colour separation images on an image-carrying member wherein the marking particles of the respective colours associated with the respective colour separation images are positioned contiguous to each other.

BACKGROUND OF THE INVENTION

In this disclosure colour means all colours including black and white and all shades of grey. Nowadays, a large variety of digital multi-colour reproduction systems exist. Usually a distinction is made between these systems based on the kind of marking particles used, e.g. ink or toner, the imaging process employed, e.g. magnetography, or electro(photo)graphy, or inkjet, the productivity or the media range.

A distinction can also be made dependent on how the multi-colour image of marking particles is composed. For instance, the multi-colour image of marking particles may be composed of a plurality of registered colour separation images where the marking particles of the respective colours associated with the respective colour separation images are superimposed. This approach has some inherent disadvantages. Firstly, because the marking particles of the different colours are superimposed, the total marking particles pile height can be high, particularly in full colour high density image areas. Besides the fact that a high total marking particles pile height is noticeable to the customer both visually and palpably, this may also negatively influence medium curl and transport as well as reduce the resistance against external mechanical influences such as scratches and folding. Moreover, different image compositions, e.g. different density and/or colour composition, lead to topographic differences on the medium which reinforce some of the above mentioned disadvantages and reveal additional disadvantages, such as gloss differences between different image parts. These disadvantages are particularly observable when toner particles are employed as marking particles because the size of toner particles is typically in the micrometer range.

Systems generating superimposed multi-colour images usually employ a limited number of process colours, i.e. typically four colours are used which are black, magenta, cyan and yellow, where an increased number of process colours also may increase the maximum marking particles pile height.

Alternatively, the multi-colour image of marking particles may be composed of a plurality of registered colour separation images where the marking particles of the respective colours associated with the respective colour separation images are positioned contiguous to each other. This approach has the advantage of a limited marking particles pile height and imposes no limitation on the number of process colours.

Therefore, in principle, digital systems capable of producing such images have the inherent advantage of digitally reproducing images with a "look and feel" comparable to images reproduced by offset lithography, which is the quality reference for the customer. In such a system, the digital images are first decomposed into a selection of process colours of the system yielding a number of digital colour separation images. The process colours can be any colour available in the system such as e.g. black, white, cyan, magenta, yellow, red, green and blue. The respective digital colour separation images are sequentially converted in register into colour separation images of marking particles of the respective associated colour on a moving image-carrying member so as to form registered composite multi-colour images of coloured marking particles on the image-carrying member.

A possible disadvantage of the latter system is its sensitivity with respect to register errors. A register error occurs when at least two colour separation images are formed on the moving image-carrying member with a displacement relative to one another. There are many possible causes for such a displacement including, but not limited to, speed variations of the moving image-carrying member, mechanical tolerances in the parts of the system, wear and/or synchronization errors in the moving parts of the system. There are different possible appearances of such register errors in multi-colour images on the image-carrying member and by consequence also on the medium. For instance, as a result of a register error, adjoining image elements being part of different colour separation images may overlap each other on the image-carrying member yielding superimposed marking particles of the respective colours instead of contiguous ones.

To limit the visual appearance of such an error, preferably the formation process of the respective colour separation images on the image-carrying member is complementary. This means that the image formation process is such that in the process sequence marking particles of a particular colour are only accumulated on the free surface of the image-carrying member and not on coloured marking particles which are already accumulated on the image-carrying member in preceding steps. Although the visual appearance of the register error is suppressed, due to a register error for instance image pixels of different separation images partially or completely corresponding to the overlapping region of adjacent image elements on the image-carrying member are rendered inadequately leading to colour differences between the digital image and the image of coloured particles on the image-carrying member. In practice, it is observed that the register errors are much greater in the propagation direction of the image-carrying member than in the direction perpendicular thereto.

SUMMARY OF THE INVENTION

It is an object of the present invention to provide a system and method for processing digital multi-colour images which overcome the limitations and disadvantages of the related art.

It is another object of the invention to provide a system and method for processing digital multi-colour images for the reproduction thereof on a colour image reproduction system, which are capable of forming registered composite multi-colour images of coloured marking particles on a moving image-carrying member. The digital multi-colour images in the present invention are processed such that during reproduction thereof any adverse effects on image quality caused by register errors in the direction parallel to the propagation direction of the moving image-carrying member are eliminated or at least limited. Particularly, the image processing of the present invention is provided such that when reproducing the images, the correct amount of each colour is rendered while avoiding adding graininess to the images formed.

It is another object of the present invention to provide a system and method for processing digital multi-colour images for the reproduction thereof on a colour image reproduction system, which are capable of producing full-colour images with a limited marking particles pile height without imposing a limitation on the number of process colours.

In an aspect of the invention, an image processing system is disclosed for processing a digital multi-colour image for reproduction thereof on a colour image reproduction system comprising an image-carrying member by sequentially and complementary forming a plurality of registered separation images of coloured marking particles on the image-carrying member, the image processing system comprising: a generation module for generating from the digital multi-colour image a sequence of image signals of a selection of process colours, each image signal of the sequence being associated with a digital separation image of a process colour of the selection of process colours and specifying an image density value for each pixel of the digital separation image of the process colour; and a conversion module for converting the sequence of image signals into a sequence of corresponding printing signals, each printing signal of the sequence indicating for each pixel of the corresponding digital separation image whether or not image dot of marking particles of the corresponding process colour is to be formed.

The conversion module converts at least one image signal selected from the second and any following image signal of the sequence by means of a matrix-dither technique into the corresponding printing signal. The matrix-dither technique is provided such that the corresponding printing signal is built up from a raster of a two-dimensional matrix structure including threshold values being arranged in a predetermined order by comparing the input density value of each pixel of the corresponding digital separation image with the corresponding threshold value. The predetermined order here is provided such that with gradually increasing input density value a linear growth pattern is generated in a predetermined direction by alternately adding image dots to both sides.

A colour image reproduction system is a printing or copying system capable of reproducing colour. The image processing system may be incorporated in a computer which can be coupled by a network or any other interface to one or more image reproduction systems. Such an implementation has the advantage that the image processing can be executed without interfering with the operation of the image reproduction systems, which may be beneficial with respect to the productivity of the image reproduction systems. The image processing system may also be part of a colour image reproduction system. The image processing system may also be part of a colour scanner provided the colour scanner can be coupled by a network or any, other interface with a colour image reproduction system.

The image processing system, according to an embodiment of the present invention, may further comprise a correction module for correcting the second and any following image signals of the sequence of image signals generated by the image signal generation module such that the associated digital separation images of the second and any following image signal at least partially overlap with the digital separation images associated with image signals preceding in the sequence.

In an embodiment of the invention, the conversion module of the image processing system according to the present invention converts the sequence of image signals such that each printing signal is built-up by a matrix-dither technique from a raster of the same two-dimensional matrix structure.

In another aspect of the invention, a method is disclosed for processing a digital multi-colour image for reproduction thereof on a colour image reproduction system capable of complementary forming separation images of coloured marking particles, the method comprising the steps of: generating from the digital multi-colour image a sequence of image signals of a selection of process colours, each image signal of the sequence being associated with a digital separation image of a process colour of the selection of process colours and specifying an image density value for each pixel of the digital separation image of the process colour; and converting the sequence of image signals into a sequence of corresponding printing signals, each printing signal of the sequence indicating for each pixel of the corresponding digital separation image whether or not an image dot of marking particles of the corresponding process colour is to be formed, wherein at least one image signal selected from the second and any following image signal of the sequence of image signals is converted by means of a matrix-dither technique into the corresponding printing signal, the matrix-dither technique being such that the corresponding printing signal is built up from a raster of a two-dimensional matrix structure including threshold values being arranged in a predetermined order by comparing the input density value of each pixel of the corresponding digital separation image with the corresponding threshold value, the predetermined order being such that with gradually increasing input density value a linear growth pattern is generated in a predetermined direction by alternately adding image dots to both sides.

The printing signals may be forwarded to the printing unit of a colour image reproduction system. The printing unit complementary forms a plurality of registered separation images of coloured marking particles on an image-carrying member using the sequence of printing signals corresponding to the selection of process colours. The image-carrying member may be an endless member such as a belt or drum. The image-carrying member may be an image-forming member, such as e.g., in case of an electrophotographic printing unit, a member having a photoconductive outer surface, or an image-receiving member such as e.g. a member having a silicone, a fluorosilicone or a polyurethane outer surface. The composite multi-colour image is subsequently transferred from the image-carrying member to an image-receiving member. The image-receiving member may be an intermediate member or a medium.

In an embodiment of the invention, the sequence of image signals generated by the image processing system may be converted such that each printing signal is built-up by a matrix-dither technique from a raster of the same two-dimensional matrix structure.

In another embodiment of the invention, the second and any following image signal of the sequence of image signals, generated according to the method of the present invention, may be corrected such that the associated digital separation images of the second and any following image signal at least partially overlap with the digital separation images associated with image signals preceding in the sequence.

These and other objects of the present invention will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE PREFERRED EMBODIMENTS

In relation to the appended drawings, the present invention is described in detail in the sequel. Several embodiments are disclosed. It is apparent however that a person skilled in the art can imagine other equivalent embodiments or other ways of executing the present invention, the scope of the present invention being limited only by the terms of the appended claims.

Figure 1:
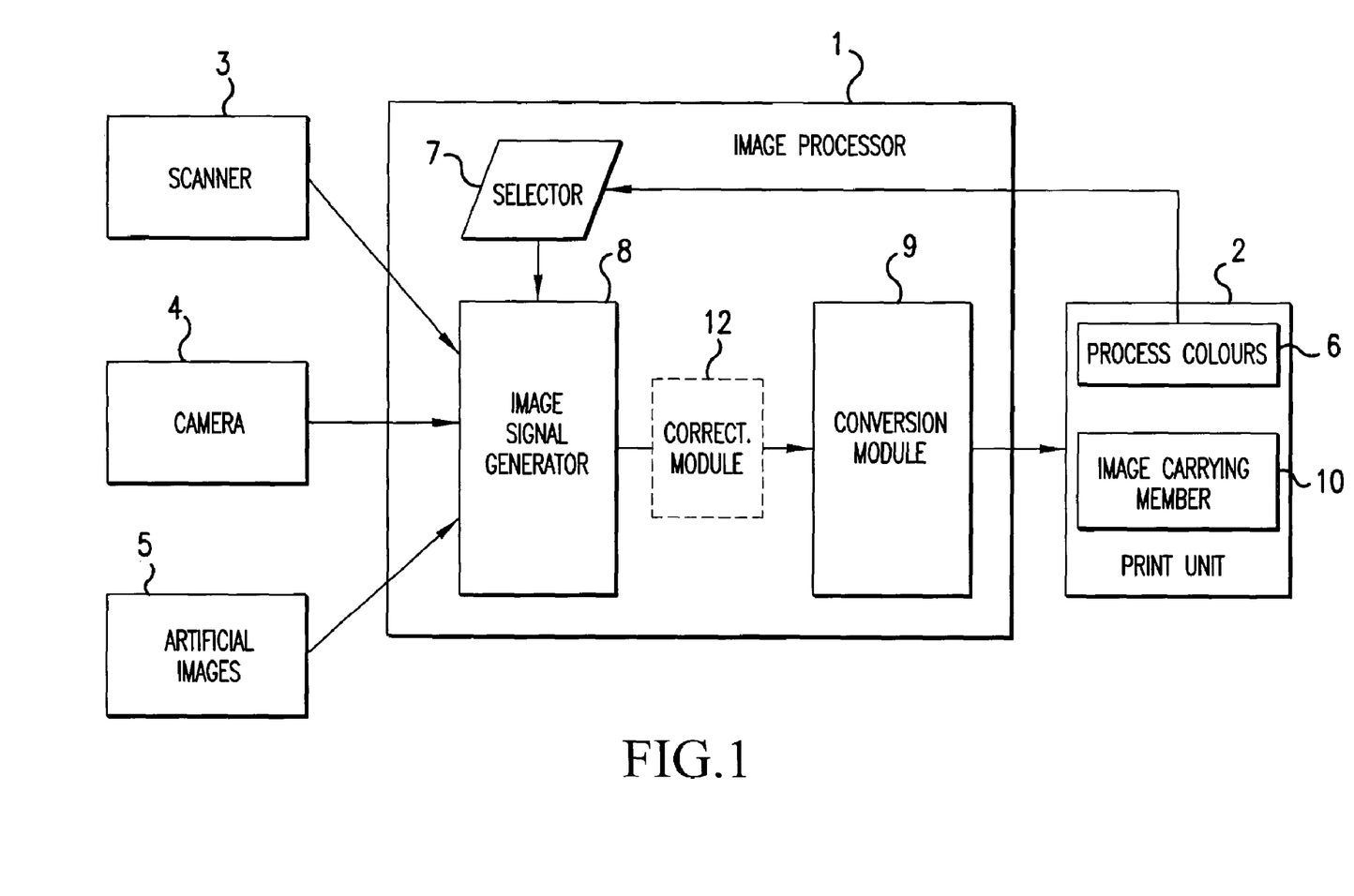
FIG. 1 depicts a schematic representation of a colour image reproduction system according to the present invention.

According to a preferred embodiment of the invention, a digital image reproduction system, i.e. a colour printing and/or copying system, as depicted in FIG. 1 comprises an image processing system (1) and a printing unit (2), all operatively coupled. A digital multi-colour image may be offered to the digital image reproduction system for reproduction thereof. There are numerous ways to generate a digital image. For instance, a digital image may be generated by scanning an original image/document using a scanner (3). The scanner (3) can be part of the digital image reproduction system or may be coupled via a network or any other interface to the digital image reproduction system. Digital still images may also be generated by a camera or a video camera (4) which may be coupled via a network or any other interface, e.g. an IEEE1394 interface, to the digital image reproduction system. Besides digital images generated by a scanner or a camera, which are usually in a bitmap format or a compressed bitmap format also artificially created, e.g. by a computer program, digital images or documents (5) may be offered to the digital image reproduction system. The latter images are usually in a structured format including but not limited to a page description language (PDL) format and an extensible markup language (XML) format. Examples of a PDL format are PDF (Adobe), PostScript (Adobe), and PCL (Hewlett-Packard).

Regardless of the origin of the digital image one may opt to store the digital image in a memory such that it can be easily retrieved by the image processing system either directly or via any interface.

The image processing system (1) includes a selector (7), an image signal generator (8), a conversion module (9), and a correction module (12), all operatively coupled.

The image signal generator (8) of the image processing system generates a sequence of image signals for a selection of process colours selected by the selector (7). The process colours correspond to the colours (6) of the marking particles available in the printing unit (2). Examples of process colours are black, white, cyan, magenta, yellow, red, green and blue. Any selection from the available process colours can be made by the selector (7). For instance, a selection can be made dependent on the colour gamut required to adequately reproduce the digital image and/or the desired quality level. Each image signal has a one-to-one relationship with a separation image of a particular process colour of the selection. The image signal specifies at least an image density value for each pixel of the associated separation image of the corresponding process colour. The image density value is typically an 8-bit value which enables the use of 256 grey levels per process colour. The pixel size is usually the same for each process colour and, although not required, is usually chosen or tuned such that the pixel size corresponds to the image dot size of the printing unit (2). Preferably the sequence wherein the image signals are generated corresponds to the sequence wherein the separation images of coloured marking particles are formed by the printing unit (2).

The conversion module (9) converts the sequence of image signals by means of a halftone technique into a sequence of corresponding printing signals. Each printing signal indicates for each pixel of the corresponding digital separation image whether or not an image dot of marking particles of the corresponding process colour is to be formed. This indication may be made using a single bit or multi-bit value dependent on the halftoning capabilities of the printing unit (2). If the printing unit (2) is capable of multi-level halftoning, a multi-bit value may be used, where the number of bits relates to the number of grey levels which can be reproduced per pixel by the printing unit (2). Usually the printing unit (2) may be only capable of binary halftoning or in other words a single bit value, i.e. "0" or "1", which indicates whether or not an image dot is to be formed. In principle, the image signal associated with the digital separation image of the selected process colour which is rendered firstly by the printing unit (2) may be converted into the first printing signal of the sequence of printing signals by any halftone technique.

Examples of halftoning techniques are matrix-dithering, random halftoning, and error-diffusion or any combination thereof. Matrix dithering produces a raster of pixels arranged in a regular matrix structure of several different threshold values. Random halftoning produces a raster where the pixels are randomly arranged. In error diffusion, the image density value of a pixel is compared with a threshold value. The difference between these two values is distributed over the neighbouring pixels.

Figure 2A:
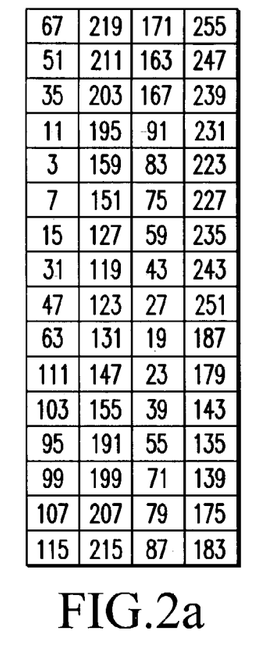
FIGS. 2a-2d depict a halftone solution according to an embodiment of the present invention.

The sequence of printing signals corresponds to the sequence wherein the respective selected process colours are formed by the printing unit (2). The second and any following printing signals are obtained by converting the image signals of the corresponding process colours using a matrix dither technique according to the present invention. The matrix dither technique according to the present invention is such that the printing signal is built up from a raster of a two-dimensional matrix structure including threshold values being arranged in a predetermined order by comparing the input density value of each pixel of the process colour with the corresponding threshold value. Here, the predetermined order is made such that with gradually increasing input density value a linear growth pattern is generated parallel to the propagation direction of the image-carrying member by alternately adding image dots to both sides. An example of such a matrix structure is depicted in FIG. 2a.

The printing unit (2) comprises an image-carrying member (10) which can be moved cyclically. The image-carrying member (10) is an endless member, e.g. a drum or belt, and may have a layered structure. Any number of process colours (6) can be available on the printing unit (2). Responsive to a sequence of printing signals, the printing unit (2) sequentially forms the respective separation images of marking particles of the corresponding process colour on the image-carrying member (10). The printing unit (2) is configured such that the respective separation images of marking particles are formed complementary. This means that marking particles of a process colour are accumulated on the free surface of the image-carrying member (10) and substantially not on coloured marking particles already accumulated oh the image-carrying member (10). "Substantially not" means that any superimposed marking particles of different process colours may not lead to visual deficiencies, i.e. visual with the naked human eye, in the finally printed image.

After the formation of the registered multi-colour image, the printing unit (2) subsequently transfers the multi-colour image of marking particles, optionally via one or more intermediate members, to a fixing medium where it may be fixed or printed simultaneously or thereafter. The fixing medium can be in web or sheet form and may be composed of e.g. paper, cardboard, label stock, plastic or textile. The intermediate member may be an endless member, such as a belt or drum, which can be moved cyclically. The transfer to the fixing medium or the intermediate member can be made by means of pressure, or pressure and heat. Dependent on the nature and resistivity of the marking particles, this transfer may be assisted electrostatically and/or magnetically and/or by means of a vibration force, e.g. sonically. An example of such a printing unit is disclosed in European Patent Application Publication No. 373704 (Van Stiphout et al), which is hereby incorporated by reference. In this disclosure, the image-carrying member is a cylindrical drum having an outer layer of silicone rubber. Another example is disclosed in U.S. Pat. No. 6,352,806 (Dalal) where the image-carrying member is a belt having a photo-conductive outer layer.

EXAMPLE

With reference to the drawings, by means of an example it will be described how a digital multi-colour image can be reproduced by means of the digital colour image reproduction system of FIG. 1 employing a halftoning technique according to the present invention in order to minimize the influence of register errors, particularly in the direction parallel to the propagation direction of the image-carrying member of the printing unit.

Suppose for instance that an original multi-colour image is scanned at a resolution of 600 dpi×600 dpi resulting in a digital multi-colour image being composed of three separation images respectively of the colours red (R), green (G) and blue (B). The image signals associated with the respective separation images specify for each pixel of the respective colour an image density value using an 8-bit representation. An 8-bit representation enables to define 256 levels each corresponding with a particular tonal value. This digital multi-colour image is forwarded to a digital colour printing system of the present invention such as the system in FIG. 1.

Suppose a selection of 4 process colours is made by the selector (7), where the selected process colours may be black (K), cyan (C), magenta (M) and yellow (Y). The image signal generator (8) of the image processing system then receives and transforms the three image signals associated with the separation images of the RGB colours into four image signals associated with the separation images of the selected process colours, being CMYK. Known colour management techniques may be used in order to render the colours of the original adequately. When appropriate, with known techniques also the raster may be adapted during the transformation preferably such that the pixel size of the separation images of the process colours matches the image dot size of the printing unit (2). In this example, the pixel size of the scanned image, being about 42 μm×42 μm, i.e. an image resolution of 600 dpi×600 dpi, is converted to a pixel size of about 42 μm×10.5 μm, i.e. an image resolution of 600dpi×2400 dpi, as the printing unit (2) is capable of printing with a resolution of 600 dpi in the direction perpendicular to the propagation direction of the image-carrying member (10) and of 2400 dpi in the direction parallel to the propagation direction of the image-carrying member (10). The image signals now specify for each pixel, having a pixel size of about 42 μm×10.5 μm, an image density value using a 8-bit number.

The image signals output from the image signal generator (8) are then converted into corresponding printing signals using, e.g., a halftone technique, by the conversion module (9) as discussed above. These printing signals are then output to the printing unit (2) for printing.

The printing unit (2) is capable of forming the sequence of separation images of marking particles of the respective process colours complementary in the following order: first K, then M, C and finally Y. This means that when for instance the separation image of marking particles of the magenta colour is to be formed on the image-carrying member (10), the separation image of marking particles of the black colour is already present and therefore the separation image of marking particles of the magenta colour is to be formed outside the image parts of the separation image of marking particles of the black colour. Adjoining image elements or even image dots of the black and magenta colour are highly sensitive to register errors. A register error may for instance lead to incomplete adjoining image elements resulting in the visualization of the background of the image carrying member (10) in-between these incomplete adjoining image elements, which is a very disturbing artefact. This register error can be made less visible by deliberately creating an overlap between adjoining image elements of in this case the black separation image and the magenta separation image, knowing that the magenta marking particles are substantially not accumulated on the black marking particles already present on the image-carrying member.

To obtain such an overlap according to the present invention, the image signals of the second and any following selected process colours, i.e. in this case MCY, are corrected by means of a correction module (12) taking into account the coverage of marking particles of any previously printed process colour. For example C is corrected taking into account the coverage of K and M. The correction module (12) can be part of the element (8) or (9), or disposed between the elements (8) and (9) as shown, or disposed in any appropriate location in the system of FIG. 1.

The precise correction algorithm of the correction module (12) may highly depend on the choice of the halftoning technique(s) used to convert the sequence of image signals into a corresponding sequence of printing signals. In this example the halftoning technique used to convert the sequence of image signals into a corresponding sequence of printing signals is a binary matrix-dither technique employing a raster of the same matrix structure for each process colour. In that case, the correction algorithm is such that the image density values of the pixels of the second and following process colours are corrected by adding the image density values of the preceding process colours (in the printing sequence) associated with that pixel, to the corresponding image density value of the current process colour.

The raster is a repetitive pattern of a matrix structure, containing 64 cells (16 parallel to the propagation direction of the image-carrying member, 4 perpendicular thereto) all having a different threshold value. Therefore each matrix structure is capable of rendering 64 tonal values. The size of each cell corresponds to the minimum image dot size which can be rendered by the printing unit (2). A printing signal associated with a separation image of a process colour is generated by comparing each pixel of that process colour with a corresponding cell of the raster. If the image density value of the pixel is equal to or higher than the threshold value of the corresponding cell, the printing signal indicates that an image dot of marking particles of that process colour is to be formed. If the image density value of the pixel is below the threshold value, the printing signal indicates that no image dot of marking particles of that process colour is to be formed. Although the 8-bit image density value per pixel is converted into a single bit value, the number of grey levels which can be rendered only decreases with a factor of 4. An example of such a matrix structure is described in FIG. 2a. Any distribution of threshold values between the minimum and maximum image density may be selected. The threshold values are arranged in a predetermined order. This order is made such that with gradually increasing image density value a linear growth pattern of image dots of marking particles is generated parallel to the propagation direction of the image-carrying member by alternately adding image dots to both sides. The following examples of the implementation of the present invention are provided to enhance understanding.

First Example on Matrix Structure Level

Figure 2B:
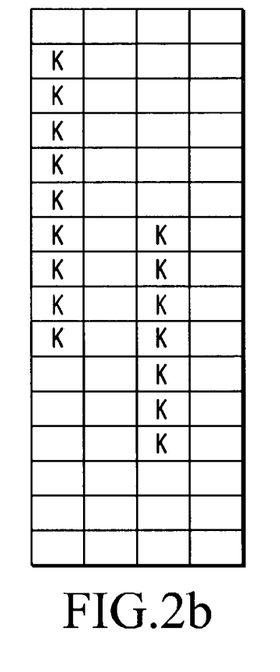

Suppose further by means of example that a part of the digital image is selected having an area of the same size as a single matrix structure of the raster as in FIG. 2a, where 25% of the selected part contains black and 10% magenta. Black precedes magenta in the printing sequence and is the first process colour to be printed. Therefore no correction for an overlap is to be applied to the image signal associated with the black separation image. The image signal associated with the black separation image is binary halftoned using the threshold matrix structure of FIG. 2a. In the resulting printing signal, the cells indicating K will render image dots of black marking particles (FIG. 2b). Magenta however is preceded by black. Therefore preferably the image signal associated with the magenta separation image is corrected in order to create an overlap between both images as discussed above. In this example the correction may be such that the magenta separation image completely overlaps the black separation image. This is done on pixel level by adding the 8-bit image density values of the black colour to the corresponding 8-bit image density values of the magenta colour.

Figure 2C:
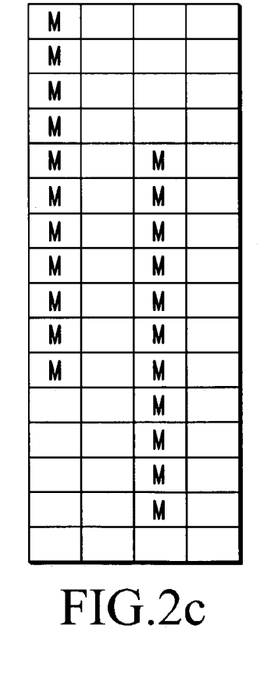
Figure 2D:
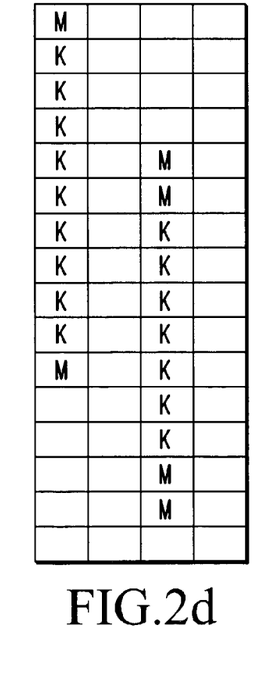
Figure 2E:
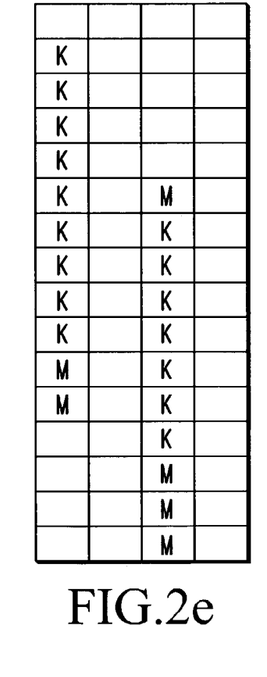
FIG. 2e depicts the effect of a register error using the halftone solution depicted in FIGS. 2a- 2d.

The corrected magenta image signal is halftoned using the same matrix structure (FIG. 2a). This is done such that with gradually increasing image density value of the magenta colour a linear growth pattern of image dots of magenta marking particles is generated parallel to the propagation direction of the image-carrying member (10) by alternately adding magenta image dots to both sides. The resulting printing signal is depicted in FIG. 2c. As can be seen, as a result of the correction the coverage of the magenta separation image, when rendered separately, would be 35%. However as black precedes magenta, due to the complementary printing process the multi-colour image as depicted in FIG. 2d is formed on the image-carrying member (10) yielding a 10% magenta marking particles coverage. Suppose for instance that a register error in the direction parallel to the propagation direction of the image-carrying member (10) would result in a shift of one pixel of the magenta separation image with respect to the black separation image, then as can be seen in FIG. 2e this would hardly effect the image quality as there is no change in the amount of magenta marking particles formed on the image-carrying member (10).

Second Example on Matrix Structure Level

Figure 3A:
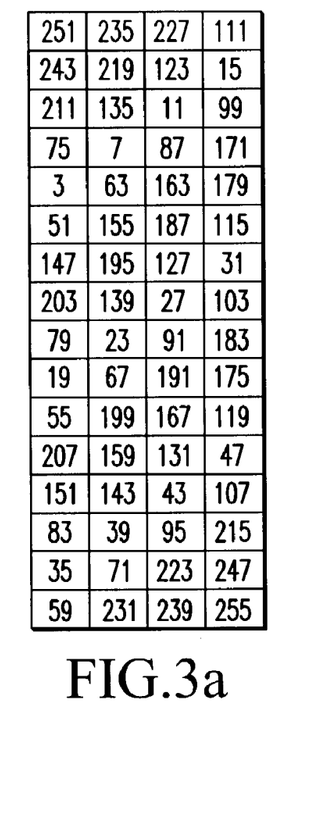
FIGS. 3a-3c depict a halftone solution according to an embodiment of the present invention. The same image part as in FIG. 2 is processed with the addition of a yellow image portion.

Suppose further by means of example that a part of the digital image is selected having an area of the same size as a single matrix structure of the raster as in FIG. 2a, where 25% of the selected part contains black, 10% magenta and 10% yellow. Black precedes magenta and magenta precedes yellow in the printing sequence. Analogous to the first example, first black and magenta are halftoned using a raster of the same matrix structure, yielding an image as depicted in FIG. 2d. For yellow, one may opt not to work with the raster of the same matrix structure as used for the halftoning of the black and magenta separation images, as the human eye is less sensitive for image errors associated with the rendering of the yellow colour. Instead a different matrix structure, e.g. the structure as depicted in FIG. 3a, may be used. As according to this example, the respective separation images are rendered complementary, the image signal associated with the yellow separation image may be corrected in order to compensate for any overlap with the separation images already rendered, being the black and magenta images. The rendered black and magenta images cover 35% of the available image area. Because of the complementary process, this means that 65% of the image area is still available to render the yellow image. As the yellow image area is to be formed with a coverage value of 10%, the corrected coverage value is about 15%, which is obtained by dividing 100% by 65% and multiplying the result by 10%. This corrected coverage value is used to determine corrected image density values for the pixels associated with the yellow image signal.

Figure 3B:
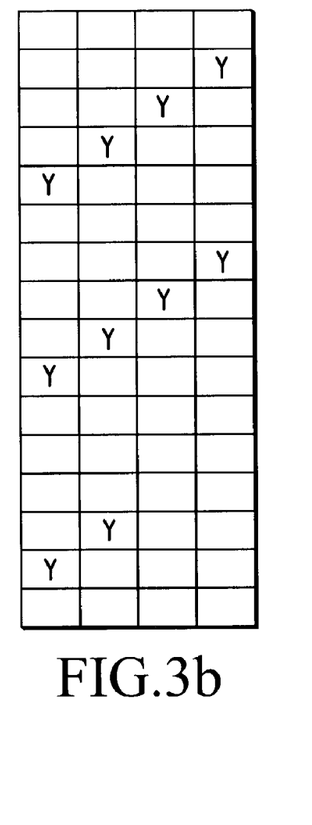
Figure 3C:
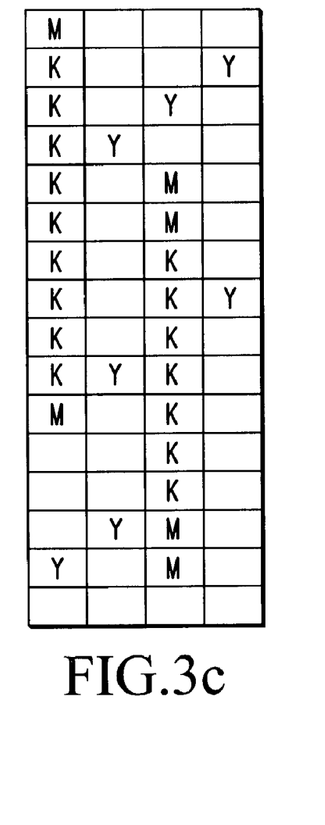

The corrected image signal for the yellow image is halftoned using the matrix structure as depicted in FIG. 3a. Contrary to the threshold values in FIG. 2a, the threshold values of FIG. 3a are arbitrarily distributed. The resulting printing signal is depicted in FIG. 3b. As can be seen, as a result of the correction, the coverage of the magenta separation image, when rendered separately, would be 15%. However as black and magenta precede yellow, due to the complementary printing process the multi-colour image as depicted in FIG. 3c is formed on the image-carrying member (10) yielding about 10% yellow marking particles coverage. A register error in the direction parallel to the propagation direction of the image-carrying member (10) would hardly affect the image quality of the black and magenta images.

The yellow image could be affected, but as stated before this may well be acceptable, dependent on the image quality level desired. In practice, one may opt to select two or more colours which are in respect to each other the most sensitive to image errors caused by misregistering and apply the present invention on the halftoning of these colours only by using for each of those selected colours a raster of the same matrix structure as was done in the present example for black and magenta.

The processing steps of the present invention are implementable using existing computer programming language. Such computer program(s) may be stored in memories such as RAM, ROM, PROM, etc. associated with computers. Alternatively, such computer program(s) may be stored in a different storage medium such as a magnetic disc, optical disc, magneto-optical disc, etc. Such computer program(s) may also take the form of a signal propagating across the Internet, extranet, intranet or other network and arriving at the destination device for storage and implementation. The computer programs are readable using a known computer or computer-based device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An image processing system for processing a digital multi-color image for reproduction thereof on a color image reproduction system including an image-carrying member by sequentially and complementary forming a plurality of registered separation images of colored marking particles on said image-carrying member, said image processing system comprising:
    a generation module configured to generate from said digital multi-color image a sequence of image signals for a selection of process colors, each image signal of said sequence of image signals being associated with a digital separation image of a process color of said selection of process colors and specifying an image density value for each pixel of said digital separation image of said process color; and
    a conversion module configured to convert said sequence of image signals into a sequence of corresponding printing signals, each printing signal of said sequence of corresponding printing signals indicating for each pixel of a corresponding digital separation image whether an image dot of marking particles of a corresponding process color is to be formed;
    wherein said conversion module is configured to convert at least one image signal selected from a second image signal of said sequence by using a matrix-dither technique into a corresponding printing signal, said matrix-dither technique being such that the corresponding printing signal is built up from a raster of a two-dimensional matrix structure including threshold values being arranged in a predetermined order by comparing an input density value of each pixel of a corresponding digital separation image with a corresponding threshold value, said predetermined order being such that, by gradually increasing the input density value, a linear growth pattern is generated in a predetermined direction by alternately adding image dots to both sides of printed images dots previously printed in the predetermined direction.

2. The image processing system as recited in claim 1, wherein said generation module is configured to generate said sequence of image signals to correspond to the sequence with which said color image reproduction system forms separation images of colored marking particles of said selection of process colors on said image-carrying member.

3. The image processing system as recited in claim 1, further comprising:
    a correction module configured to correct the second and any following image signal of said sequence of image signals generated by said generation module such that the associated digital separation images of said second and any following image signal at least partially overlap with the digital separation images associated with image signals preceding in said sequence.

4. The image processing system as recited in claim 1, wherein the conversion module is configured to convert the sequence of image signals such that each printing signal is built-up by said matrix-dither technique from a raster of the same two-dimensional matrix structure.

5. A method for processing a digital multi-color image for reproduction thereof on a color image reproduction system capable of complementary forming separation images of colored marking particles, said method comprising the steps of:
    generating, by a generation module of an image processor, from said digital multi-color image a sequence of image signals for a selection of process colors, each image signal of said sequence of image signals being associated with a digital separation image of a process color of said selection of process colors and specifying an image density value for each pixel of said digital separation image of said process color; and
    converting, by a conversion module of the image processor, said sequence of image signals into a sequence of corresponding printing signals, each printing signal of said sequence of corresponding printing signals indicating for each pixel of a corresponding digital separation image whether an image dot of marking particles of a corresponding process color is to be formed;
    wherein at least one image signal selected from a second and any following image signal of said sequence of image signals is converted by using a matrix-dither technique into a corresponding printing signal, said matrix-dither technique being such that said corresponding printing signal is built up from a raster of a two-dimensional matrix structure including threshold values being arranged in a predetermined order by comparing an input density value of each pixel of a corresponding digital separation image with a corresponding threshold value, said predetermined order being such that, by gradually increasing the input density value, a linear growth pattern is generated in a predetermined direction by alternately adding image dots to both sides of printed images dots previously printed in the predetermined direction.

6. The method as recited in claim 5, further comprising the step of:
    correcting, by a correction module of the image processor, the second and any following image signal of said sequence of image signals such that the associated digital separation images of said second and any following image signal at least partially overlap with the digital separation images associated with image signals preceding in said sequence.

7. The method as recited in claim 6, wherein the sequence of image signals is converted such that each printing signal is built-up by a matrix-dither technique from a raster of the same two-dimensional matrix structure.

8. The method as recited in claim 5, further comprising the step of:
complementary forming, by a printing device, a plurality of registered separation images of colored marking particles on an image-carrying member using said sequence of printing signals.

9. The method as recited in claim 8, wherein said predetermined direction is a direction parallel to the propagation direction of the image-carrying member.

10. The method as recited in claim 8, further comprising the step of:
transferring, by the printing device, said plurality of registered separation images of colored marking particles from said image-carrying member to an image-receiving member.

11. A computer-readable storage medium containing a computer program for processing a digital multi-color image for reproduction thereof on a color image reproduction system capable of complementary forming separation images of colored marking particles, the computer program comprising computer-executable instructions for: generating from said digital multi-color image a sequence of image signals for a selection of process colors, each image signal of said sequence of image signals being associated with a digital separation image of a process color of said selection of process colors and specifying an image density value for each pixel of said digital separation image of said process color; and converting said sequence of image signals into a sequence of corresponding printing signals, each printing signal of said sequence of corresponding printing signals indicating for each pixel of a corresponding digital separation image whether an image dot of marking particles of a corresponding process color is to be formed; wherein at least one image signal selected from a second and any following image signal of said sequence of image signals is converted by using a matrix-dither technique into a corresponding printing signal, said matrix-dither technique being such that said corresponding printing signal is built up from a raster of a two-dimensional matrix structure including threshold values being arranged in a predetermined order by comparing an input density value of each pixel of t-he-corresponding digital separation image with a corresponding threshold value, said predetermined order being such that by gradually increasing the input density value, a linear growth pattern is generated in a predetermined direction by alternately adding image dots to both sides of printed images dots previously printed in the predetermined direction.

12. The computer-readable storage medium as recited in claim 11, further comprising computer-executable instructions for: correcting the second and any following image signal of the sequence of image signals such that the associated digital separation images of the second and any following image signal at least partially overlap with the digital separation images associated with image signals preceding in the sequence.

13. The computer-readable storage medium as recited in claim 11, wherein the computer-executable instructions for converting convert the sequence of image signals such that each printing signal is built-up by the matrix-dither technique from a raster of the same two-dimensional matrix structure.

14. The computer-readable storage medium as recited in claim 11, further comprising computer-executable instructions for: complementary forming a plurality of registered separation images of colored marking particles on an image-carrying member using said sequence of printing signals.

15. The computer-readable storage medium as recited in claim 14, wherein said predetermined direction is a direction parallel to the propagation direction of the image-carrying member.

16. The computer-readable storage medium as recited in claim 14, further comprising computer-executable instructions for: transferring said plurality of registered separation images of colored marking particles from said image-carrying member to an image-receiving member.

* * * * *